(12) United States Patent
Park

(10) Patent No.: US 8,186,485 B2
(45) Date of Patent: May 29, 2012

(54) ELECTRIC PARKING BRAKE

(75) Inventor: In Uk Park, Seoul (KR)

(73) Assignee: Mando Corporation, Gyeonggi-do (KR)

( * ) Notice: Subject to any disclaimer, the term of this patent is extended or adjusted under 35 U.S.C. 154(b) by 506 days.

(21) Appl. No.: 12/367,973

(22) Filed: Feb. 9, 2009

(65) Prior Publication Data

US 2009/0205912 A1 Aug. 20, 2009

(30) Foreign Application Priority Data

Feb. 20, 2008 (KR) ........................ 10-2008-0015311

(51) Int. Cl.
*F16D 65/14* (2006.01)
(52) U.S. Cl. ..................... 188/2 D; 188/265; 188/162
(58) Field of Classification Search .................. 188/2 D, 188/162, 158, 265
See application file for complete search history.

(56) References Cited

U.S. PATENT DOCUMENTS

| 5,590,744 | A * | 1/1997 | Belmond | 188/265 |
| 6,267,207 | B1 | 7/2001 | Fleischer et al. | 188/162 |
| 7,341,127 | B2 * | 3/2008 | Gil et al. | 188/2 D |
| 7,559,410 | B2 * | 7/2009 | Funk et al. | 188/2 D |
| 7,648,006 | B2 * | 1/2010 | Deutloff et al. | 188/2 D |
| 2002/0084154 | A1 | 7/2002 | Peter | 188/156 |
| 2005/0115774 | A1 * | 6/2005 | Nieto Gil et al. | 188/2 D |
| 2005/0189183 | A1 * | 9/2005 | Gil et al. | 188/2 D |
| 2006/0231352 | A1 * | 10/2006 | Funk et al. | 188/72.8 |

FOREIGN PATENT DOCUMENTS

| CN | 1898109 A | 1/2007 |
| DE | 102006000794 B3 | 6/2007 |
| JP | 2002-240691 | 8/2002 |
| KR | 1020050105766 A | 11/2005 |

* cited by examiner

*Primary Examiner* — Bradley King
(74) *Attorney, Agent, or Firm* — McDermott Will & Emery LLP

(57) ABSTRACT

Disclosed is an electric parking brake. The electric parking brake includes a motor which forms torque through an electric device, multi-stage gears coupled with the motor, a gear wheel which is mechanically linked with the multi-stage gears, a screw nut which has a hollow structure, and is integrally formed with an inner circumferential surface of the gear wheel, a spindle geared with an inner circumferential surface of the screw nut to move in a shaft direction according to rotation of the gear wheel, a parking cable linked with the spindle at an outlet side of the spindle remote from the gear wheel, a stopper member fixed to an outer circumferential surface of a second end opposite to a first end of the spindle linked with the parking cable to prevent the spindle from excessively rotating when breaking is released. In the electric parking brake, the stopper member is fixed on the outer circumferential surface of an end opposite to one end of the spindle linked with the parking cable. In braking, the spindle moves in a direction to pull the parking cable such that the parking cable is pulled to the inner part of the screw nut. The length of the spindle and the space occupied by the spindle are reduced, so that the manufacturing cost can be significantly reduced.

2 Claims, 4 Drawing Sheets

ELECTRIC PARKING BRAKE

CROSS-REFERENCE TO RELATED APPLICATION

This application claims the benefit of Korean Patent Application No. 10-2008-0015311 filed on Feb. 20, 2008, in the Korean Intellectual Property Office, the disclosure of which is incorporated herein by reference.

BACKGROUND OF THE INVENTION

1. Field of the Invention

The present invention relates to an electric parking brake. More particularly, the present invention relates to an electric parking brake capable of reducing the space occupied by a spindle as well as the length of the spindle by fixing a stopper member to an outer circumferential surface of the other end of the spindle, instead of one end of the spindle linked with a parking cable, such that a parking cable is pulled into a screw nut when a brake operates.

2. Description of the Related Art

In general, vehicle brakes are classified into a foot brake pressed by a foot and a hand brake manipulated by a hand. Parking brakes are also classified into a foot brake type and a hand brake type.

When a driver pulls up a parking brake lever or steps on a pedal after parking a vehicle, a pulley rotates so that a cable linked with the pulley is pulled, thereby operating the parking brake. Accordingly, the parking brake prevents the vehicle in a stationary state from moving by external force. In addition, even if the vehicle is parked on a slope road, the parking brake prevents the vehicle from sliding down along the slope road.

However, in such a manual parking brake, the driver must pull up the parking lever with suitable force. In addition, the parking brake lever has a large operational radius, so space utility in the vehicle may be degraded.

In order to overcome such disadvantages of the manual parking brake, recently, an electric parking brake has been suggested to automatically operate a brake using a motor. Various research and development have been performed to improve the operational performance of the electric parking brake or reduce operational noise thereof.

As shown in FIGS. 1 and 2, the electric parking brake includes a motor 1, multi-stage gears 2, a gear wheel 3, a screw nut 4, a spindle 5, a parking cable 6, and a stopper member 7. The motor 1 forms torque through an electric device. The multi-stage gears 2 are coupled with the motor 1. The gear wheel 3 is mechanically linked with the multi-stage gears 2. The screw nut 4 has a hollow structure, and is integrally formed with an inner circumferential surface of the gear wheel 3. The spindle 5 is geared with the inner circumferential surface of the screw nut 4 to move in a shaft direction according to the rotation of the gear wheel 3. The parking cable 6 is linked with the spindle 5 at an outlet side of the spindle 5 (that is, the operational side of the parking cable 6). The stopper member 7 is fixed to an outer circumferential surface of the spindle 5, which is a coupling part between the spindle 5 and the parking cable 6, to prevent the spindle 5 from rotating due to excessive pulling of the spindle 5 when the brake is operated.

As shown in FIG. 1, in the parking braking having the above structure, if power is applied to the motor 1, the motor 1 is driven, and then the multi-stage gears 2 are rotated at a rotation speed reduced by a reduction gear set provided in a gear box due to the driving of the motor 1. Then, the gear wheel 3 engaged with the multi-stage gears 2 is rotated. Subsequently, the screw nut 4, which has a hollow structure and is integrated with the inner circumferential surface of the gear wheel 3, is rotated. As the screw nut 4 is rotated, the spindle 5 screwed with the screw nut 4 therein is moved as shown in FIG. 2. Then, the parking cable 6, which is linked with the spindle 5 at the outlet side (the operational side of the parking cable 6) of the spindle 5, that is, one end of the spindle 5 remote from the gear wheel 3, is pulled. If the parking cable 6 is fully pulled, the spindle 5 is prevented from rotating by the stopper member 7 fixed to the outer circumferential surface of the end of the spindle 5 linked with the parking cable 6.

However, in the electric parking brake having the above structure, since the stopper member 7 is fixed to the outer circumferential surface of the end of the spindle 5 linked with the parking cable 6, the spindle 5 is moved toward the outlet side (the operational side of the parking cable) when braking is released as shown in FIG. 1. Therefore, the spindle 5 must have a long length. As a result, the spindle 5 occupies an excessive space, and the manufacturing cost of the spindle 5 is increased.

SUMMARY OF THE INVENTION

Accordingly it is an aspect of the present invention to provide an electric parking brake capable of reducing the space occupied by a spindle and the length of the spindle by fixing a stopper member to an outer circumferential surface of the other end of the spindle instead of one end of the spindle linked with a parking cable such that a parking cable is pulled into a screw nut when a brake is operated.

Additional aspects and/or advantages of the invention will be set forth in part in the description which follows and, in part, will be apparent from the description, or may be learned by practice of the invention.

The foregoing and and/or other aspects of the present invention are achieved by providing an electric parking brake. The electric parking brake includes a motor which forms torque through an electric device, multi-stage gears coupled with the motor, a gear wheel which is mechanically linked with the multi-stage gears, a screw nut which has a hollow structure, and is integrally formed with an inner circumferential surface of the gear wheel, a spindle geared with an inner circumferential surface of the screw nut to move in a shaft direction according to rotation of the gear wheel, a parking cable linked with the spindle at an outlet side of the spindle remote from the gear wheel, and a stopper member fixed to an outer circumferential surface of a second end opposite to a first end of the spindle linked with the parking cable to prevent the spindle from excessively rotating when breaking is released.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
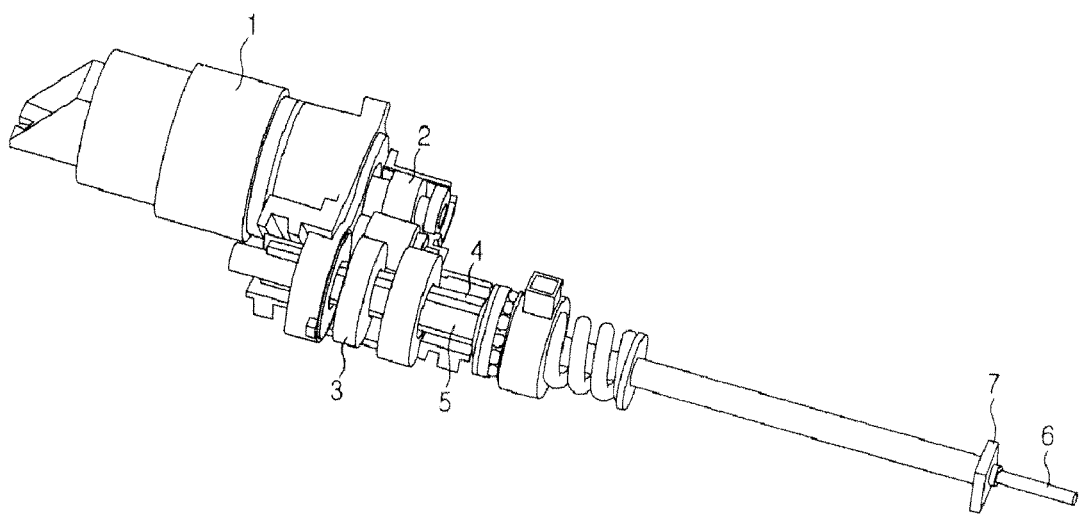
FIG. 1 is a perspective view showing a conventional electric parking brake.
Figure 2:
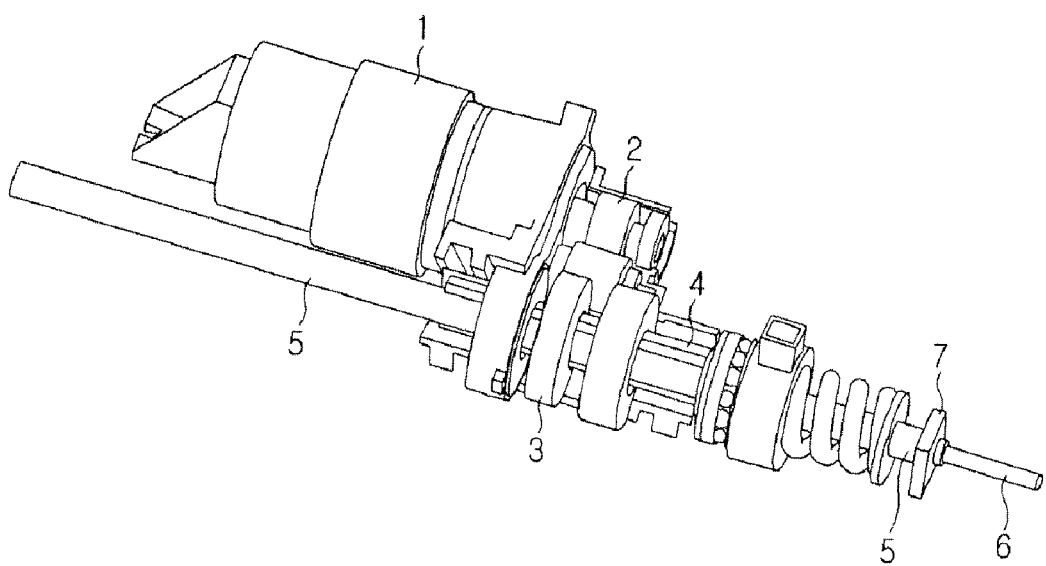
FIG. 2 is a perspective view showing the operational state of the conventional electric parking brake.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
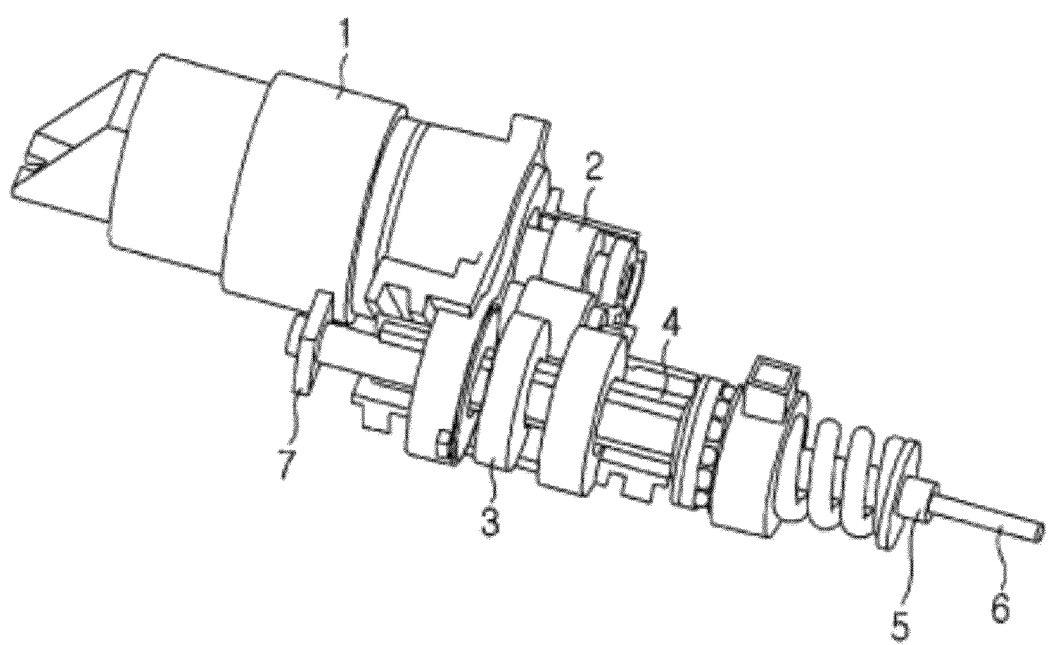
FIG. 3 is a perspective view showing an electric parking brake according to the present invention.
Figure 4:
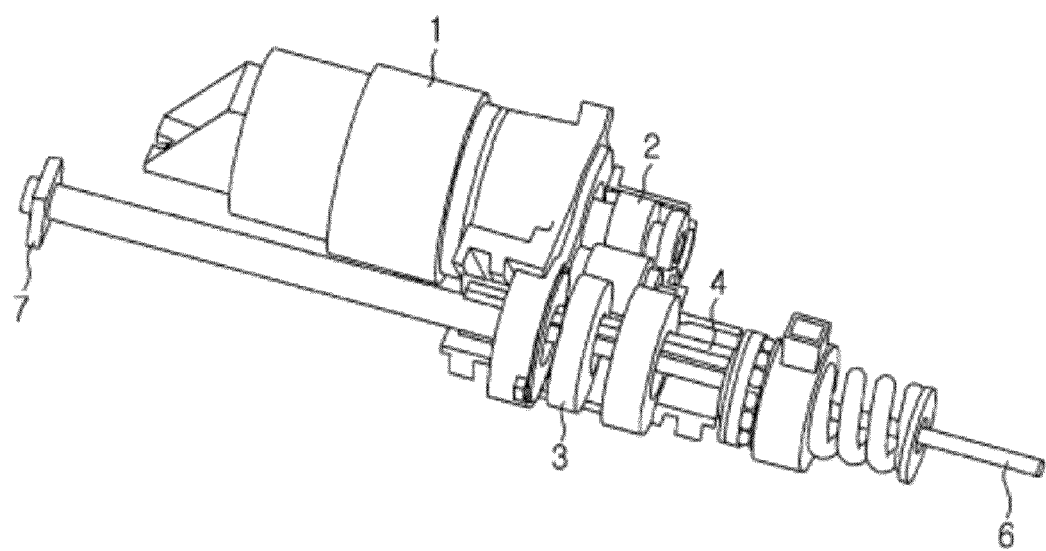
FIG. 4 is a perspective view showing an electric parking brake according to the present invention.

FIG. 3 is a perspective view showing an electric parking brake according to the present invention, and FIG. 4 is a perspective view showing the operational state of the electric parking brake according to the present invention.

As shown in FIGS. 3 and 4, the electric parking brake according to the present invention includes a motor 1, multi-stage gears 2, a gear wheel 3, a screw nut 4, a spindle 5, a parking cable 6, and a stopper member 7. The motor 1 forms torque through an electric device. The multi-stage gears 2 are coupled with the motor 1. The gear wheel 3 is mechanically linked with the multi-stage gears 2. The screw nut 4 has a hollow structure and is integrally formed with an inner circumferential surface of the gear wheel 3. The spindle 5 is geared with the inner circumferential surface of the screw nut 4 to move in a shaft direction according to the rotation of the gear wheel 3. The parking cable 6 is coupled with the spindle 5 at an outlet side of the spindle 5 remote from the gear wheel 3. The stopper member 7 is fixed on an outer circumferential surface of a second end opposite to a first end of the spindle 5 linked with the parking cable 6 to prevent the spindle 5 from excessively rotating when breaking is released. The parking cable 6 is linked with the first end of the spindle 5 such that the parking cable 6 is pulled to be positioned to the inner part of the screw nut 4 in braking.

Hereinafter, the operation of the electric parking brake having the structure according to the present invention will be described.

If power is applied to the motor 1 in order to operate the electric parking brake in the operational state of FIG. 3, the motor 1 is driven, and then the multi-stage gears 2 are rotated at a rotation speed reduced by a reduction gear set provided in a gear box due to the driving of the motor 1. Then, the gear wheel 3 engaged with the multi-stage gears 2 is rotated. Subsequently, the screw nut 4, which has a hollow structure and is integrally formed with the inner circumferential surface of the gear wheel 3, is rotated. As the screw nut 4 is rotated, the spindle 5 screwed with the screw nut 4 therein is moved as shown in FIG. 4. Then, the parking cable 6, which is linked with the spindle 5 at an outlet side of the spindle 5, that is, one end of the spindle 5 remote from the gear wheel 3, is pulled to an inner hollow part of the screw nut 4. In contrast, when braking is released, the screw nut 4 rotates in a direction opposite to a rotation direction in braking, so that the parking cable 6 in the screw nut 4 is pushed to the outlet side of the spindle 5. Since the stopper member 7 is fixed on the outer circumferential surface of the second end opposite to the first end of the spindle 5 linked with the parking cable 6, the stopper member 7 prevents the spindle 5 from excessively rotating while moving to the outlet side thereof.

As described above, in the electric parking brake according to the present invention, the stopper member is fixed on the outer circumferential surface of an end opposite to one end of the spindle linked with the parking cable. Accordingly, in braking, the spindle moves in a direction to pull the parking cable such that the parking cable is pulled to the inner part of the screw nut. Therefore, the length of the spindle and the space occupied by the spindle are reduced, so that the manufacturing cost can be significantly reduced.

Although few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electric parking brake comprising
a motor which forms torque through an electric device;
multi-stage gears coupled with the motor;
a gear wheel which is mechanically linked with the multi-stage gears;
a screw nut which has a hollow structure, and is integrally formed with an inner circumferential surface of the gear wheel;
a spindle geared with an inner circumferential surface of the screw nut to move in a shaft direction according to rotation of the gear wheel;
a parking cable linked with the spindle at an outlet side of the spindle remote from the gear wheel; and
a stopper member fixed to an outer circumferential surface of a second end opposite to a first end of the spindle linked with the parking cable to prevent the spindle from excessively rotating when breaking is released,
wherein the parking cable linked with the first end of the spindle is pulled to be positioned to an inner part of the screw nut in braking.

2. The apparatus of claim 1, wherein the stopper member is positioned outside of the screw nut.

* * * * *